United States Patent
Li et al.

(10) Patent No.: US 9,866,987 B2
(45) Date of Patent: *Jan. 9, 2018

(54) PROVISIONING AN EMBEDDED SUBSCRIBER IDENTITY MODULE

(71) Applicant: Apple Inc., Cupertino, CA (US)

(72) Inventors: Li Li, Los Altos, CA (US); Arun G. Mathias, Sunnyvale, CA (US); Ben-Heng Juang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,796

(22) Filed: Jul. 22, 2016

(65) Prior Publication Data

US 2016/0337780 A1  Nov. 17, 2016

Related U.S. Application Data

(60) Continuation of application No. 14/459,212, filed on Aug. 13, 2014, now Pat. No. 9,408,012, which is a division of application No. 13/617,069, filed on Sep. 14, 2012, now Pat. No. 8,843,179.

(60) Provisional application No. 61/646,046, filed on May 11, 2012.

(51) Int. Cl.
*H04M 3/00* (2006.01)
*H04W 4/00* (2009.01)
*H04W 8/20* (2009.01)
*H04W 12/04* (2009.01)

(52) U.S. Cl.
CPC .............. *H04W 4/001* (2013.01); *H04W 8/20* (2013.01); *H04W 12/04* (2013.01)

(58) Field of Classification Search
CPC .... H04W 12/06; H04W 8/245; H04B 1/3816; H04L 9/12
USPC .......................... 455/411, 418, 558; 380/247
See application file for complete search history.

(56) References Cited

U.S. PATENT DOCUMENTS

| 7,023,994 B1 | 4/2006 | Dupré |
| 8,171,529 B2 | 5/2012 | Dadu et al. |
| 8,295,807 B2 | 10/2012 | Neumann et al. |
| 8,649,765 B1 * | 2/2014 | Hjelm ................ H04L 63/0861 455/410 |
| 8,843,179 B2 | 9/2014 | Li et al. |
| 9,408,012 B2 | 8/2016 | Li et al. |

(Continued)

FOREIGN PATENT DOCUMENTS

| EP | 2245829 A2 | 11/2010 |
| JP | 2011510571 A | 3/2011 |

(Continued)

OTHER PUBLICATIONS

International Search Report and Written Opinion for Application No. PCT/US2013/037950, dated Jul. 16, 2013, pp. 1-8.

(Continued)

*Primary Examiner* — Danh Le
(74) *Attorney, Agent, or Firm* — Downey Brand LLP

(57) ABSTRACT

Provisioning an embedded subscriber identity module (eSIM) in a user equipment (UE) device with personalized subscriber information. A request may be transmitted for personalized subscriber information. The personalized subscriber information may be received. The personalized subscriber information may be installed in an eSIM in the UE device.

20 Claims, 4 Drawing Sheets

(56) References Cited

U.S. PATENT DOCUMENTS

| | | |
|---|---|---|
| 2007/0254711 A1 | 11/2007 | Young et al. |
| 2008/0003980 A1 | 1/2008 | Voss et al. |
| 2008/0020765 A1 | 1/2008 | Black et al. |
| 2008/0020773 A1 | 1/2008 | Black et al. |
| 2008/0287100 A1 | 11/2008 | Satheesh et al. |
| 2009/0191857 A1 | 7/2009 | Horn et al. |
| 2010/0311468 A1 | 12/2010 | Shi et al. |
| 2011/0136482 A1 | 6/2011 | Kaliner |
| 2011/0159843 A1 | 6/2011 | Heath et al. |
| 2011/0265158 A1 | 10/2011 | Cha et al. |
| 2011/0306318 A1 | 12/2011 | Rodgers et al. |
| 2012/0108204 A1 | 5/2012 | Schell et al. |
| 2012/0191857 A1 | 7/2012 | Doorhy et al. |
| 2012/0196569 A1 | 8/2012 | Holtmanns et al. |
| 2012/0208597 A1 | 8/2012 | Billman |
| 2012/0260090 A1* | 10/2012 | Hauck .............. H04L 63/0853 713/168 |
| 2012/0322505 A1 | 12/2012 | Lodeweyckx |
| 2013/0108295 A1* | 5/2013 | Kanehara ........... G03G 15/0291 399/50 |
| 2013/0157673 A1* | 6/2013 | Brusilovsky .......... H04W 8/205 455/450 |
| 2013/0283040 A1 | 10/2013 | Tu |
| 2013/0303122 A1 | 11/2013 | Li et al. |
| 2013/0304800 A1* | 11/2013 | Smith ................. H04W 4/003 709/203 |
| 2013/0326214 A1* | 12/2013 | McCanna ............ H04L 9/3268 713/156 |
| 2013/0331063 A1 | 12/2013 | Cormier et al. |
| 2013/0337803 A1* | 12/2013 | Christopher .......... H04W 48/18 455/432.3 |
| 2013/0340059 A1* | 12/2013 | Christopher .......... H04W 12/04 726/7 |
| 2013/0344855 A1* | 12/2013 | Li .......................... H04W 4/16 455/417 |
| 2014/0073375 A1* | 3/2014 | Li ........................ H04W 4/001 455/558 |
| 2014/0140507 A1 | 5/2014 | Park et al. |
| 2014/0335829 A1 | 11/2014 | Petridi |
| 2014/0349617 A1 | 11/2014 | Li et al. |
| 2015/0017950 A1 | 1/2015 | Zhao et al. |

FOREIGN PATENT DOCUMENTS

| | | |
|---|---|---|
| JP | 2011525311 A | 9/2011 |
| JP | 2012085272 A | 4/2012 |
| WO | 2012058446 A1 | 5/2012 |

OTHER PUBLICATIONS

Japanese Patent Application No. 2015-511498—First Office Action dated Jan. 25, 2016.

Taiwanese Patent Application No. 104121000—Office Action dated May 27, 2016.

Japanese Patent Application No. 2015-511498—First Office Action dated Oct. 3, 2016.

Chinese Patent Application No. 201380033156.3—First Office Action dated Jul. 24, 2017.

\* cited by examiner

PROVISIONING AN EMBEDDED SUBSCRIBER IDENTITY MODULE

CROSS-REFERENCE TO RELATED APPLICATIONS

This application is a continuation of U.S. application Ser. No. 14/459,212, filed Aug. 13, 2014, which is a divisional of U.S. application Ser. No. 13/617,069 filed Sep. 14, 2012, now U.S. Pat. No. 8,843,179, which claims the benefit of U.S. Provisional Application No. 61/646,046 filed May 11, 2012. The contents of which are incorporated herein by reference in their entireties for all purposes.

FIELD

The present application relates to the field of wireless communication, and more particularly to a system and method for provisioning an embedded subscriber identity module (eSIM) in a user equipment (UE) device.

BACKGROUND

Wireless communication systems are rapidly growing in usage. Further, wireless communication technology has evolved from voice-only communications to also include the transmission of data, such as Internet and multimedia content.

Subscribers in a wireless telecommunication network (e.g., a cellular telecommunication network) are typically assigned subscriber identity information, which may for example be stored as part of a subscriber identity module (SIM) in the subscriber's user equipment (UE) device. As one example, subscribers in 3GPP (LTE/GSM/UMTS) networks have an International Mobile Subscriber Identity (IMSI) that identifies them in their carrier's network.

It is common practice for a SIM to be installed on a physical chip or card, which may be provided separately from a UE. Thus, in order to obtain a UE and be provided with service for the UE, a user may need to obtain the UE (e.g., from a wireless device vendor) and separately obtain a SIM card (e.g., from a service provider) and install it in the UE. Requiring multiple steps and interaction with both a wireless device vendor and a service provider in order to obtain service for a UE may be an annoyance for the end user. In addition, the requirement that a user remove the old SIM card, obtain a new physical SIM card, and install the new SIM card in order to change service providers may represent an additional cause of frustration to end users, and may represent a psychological barrier to switching service providers, which may indirectly result in higher costs and/or lower quality of service for the user.

The practice of using removable physical SIM cards also leaves much to be desired for service providers. As one example, using this approach requires service providers to manufacture and/or order the physical SIM cards, which represents a significant expense. In addition, keeping an inventory of physical SIM cards represents an additional set of expenses, both in terms of storage and shipping, and in terms of inventory management. Furthermore, the SIM cards may need to be provisioned well in advance of their use, which may represent an additional expense, as some or all of the provisions (e.g., IMSIs, etc.) may have a cost basis. Thus, a SIM card which sits in inventory and is not used may represent a wasted expense for service providers for a variety of reasons.

Accordingly, considering the non-trivial disadvantages of removable physical SIM cards, improvements in the field would be desirable.

SUMMARY

Various embodiments are presented of a system and method for obtaining and personalizing an embedded subscriber identity module (eSIM) in a user equipment (UE) device. In particular, use of an eSIM in a UE device, which may be personalized (e.g., provisioned and activated) over-the-air (OTA), may represent a considerable improvement over pre-provisioned, removable, physical SIM cards.

For example, user experience may be improved by the use of an eSIM in their UE device. Rather than separately obtaining the physical UE device and a physical SIM card, then installing the SIM card into the UE device, the user may be able to just obtain the UE device, which may have hardware capable of supporting an eSIM pre-installed. Furthermore, selection of a service provider may be simplified, and the process of switching service providers may be significantly eased. For example, a user may be able to more easily compare service providers' coverage and plans and/or select a plan if the provisioning process is performed over a network (and particularly if the provisioning process is performed OTA, and thus potentially in any location with wireless service), rather than in a service provider store location which only offers plans from that service provider. Along the same lines, re-provisioning an eSIM over a network (potentially including OTA) may be a simpler process of switching service providers than going into a service provider's storefront and/or waiting for delivery to obtain a new physical SIM, removing the old SIM, and installing the new SIM.

Additionally, service providers may realize a more efficient and cost-effective mechanism for provisioning UE devices with service. Because manufacture, storage, shipping, and provisioning of physical, removable SIM cards all represent real costs to service providers which may be eliminated and replaced with a relatively cost-efficient network-based just-in-time provisioning process, overall costs may be significantly reduced. Reduced operating costs of physical storefronts may also be possible, in some cases, as more plans are sold OTA and fewer personnel and/or storefronts are required to sell service plans and corresponding removable SIM cards.

Furthermore, embodiments may comprise separating SIM provisioning into two portions—e.g., common SIM information, which may be common to some or all SIMs according to various types or classes (e.g., based on service provider, device hardware, or other factors), and personalized SIM information, which may be specific to a subscriber—which may offer further flexibility and efficiency in eSIM provisioning. For example, if common SIM information is pre-loaded into applicable UE devices, a significant amount of network bandwidth may be saved, as this portion of the SIM may typically be significantly larger than the personalized SIM information. Other benefits will also be apparent to those of skill in the art in light of this disclosure.

The present disclosure is thus directed to such a method for provisioning an eSIM in a UE device, to a UE device configured to implement such a method, and/or to a computer accessible memory medium storing program instructions executable by a processor to implement such a method.

The UE device may include one or more antennas for performing wireless communication. The UE device may also include a processor configured to execute program instructions. In addition, the UE device may include a non-transitory computer accessible memory medium, which may store program instructions executable by the UE device. The method may be performed as follows.

A request to provision the eSIM may be transmitted. The request may be provided by the UE device to a first server. The request may be transmitted wirelessly (e.g., via a carrier network or a wi-fi access point) or in a wired manner (e.g., via Ethernet, optic cables, etc) over one or more networks (e.g., LAN, WAN, cellular network, WLAN, WiMAX, etc).

The request to provision the eSIM may include a single request for both common SIM information and personalized SIM information, or individual requests for common SIM information and/or for personalized SIM information. For example, the eSIM may include the common SIM information pre-loaded or pre-installed in the eSIM on the UE device; in such cases, the UE device might only request the personalized SIM information.

The common SIM information may be for provisioning the eSIM on the UE device with non-subscriber-specific information, while the personalized SIM information may be for provisioning the eSIM on the UE device with subscriber-specific information.

The first server may transmit the common SIM information to the UE device, e.g., if the common SIM information is not pre-loaded in the UE device. The UE device may receive the common SIM information from the first server and install the common SIM information in the eSIM on the UE device. The UE device may transmit an indication that the common SIM information has been installed on the UE device.

The first server may transmit a request for personalized SIM information to a second server. In some embodiments, the first server may transmit the request for personalized SIM information to the second server in response to receiving the indication that the common SIM information has been installed on the UE device.

Alternatively, the UE device may transmit the request for personalized SIM information directly to the second server. The second server may transmit the personalized SIM information to the UE device (or to the first server, which may transmit the personalized SIM information to the UE device). In either case, the UE device may receive the personalized SIM information.

If desired, the personalized SIM information may be encrypted, e.g., using a carrier key. Thus, the personalized SIM information may be transmitted to the UE device in encrypted form. The carrier key may be provided to the UE device as part of the common SIM information, or in another way. If the personalized SIM information is encrypted, the UE device may decrypt the personalized SIM information, e.g., using the carrier key provided to the UE device as part of the common SIM information.

The UE device may install the personalized SIM information in the eSIM on the UE device. Note that the eSIM may be stored in the UE device in multiple ways. For example, the eSIM may be stored on an embedded smart card (e.g., an eUICC). Additionally, part or all of the eSIM may be installed and stored in device memory and executed by a device processor (e.g., an application processor). Note also that in some embodiments, the UE may install the personalized SIM information in a SIM on a removable smart card (e.g., a removable UICC).

Once the common SIM information and the personalized SIM information installed in the eSIM in the UE device, the UE device may be fully provisioned, and the UE device may be able to access a carrier network using the eSIM.

If desired, the method may further include re-provisioning or requesting additional provisioning for the eSIM. For example, a user may wish to change their carrier or be provided with additional service from another carrier. In this case, a second request for provisioning information for the eSIM may be transmitted, e.g., to the eSIM server (or a different eSIM server). In response, second personalized SIM information (and possibly second common SIM information) may be received by the UE device. The second personalized SIM information (and second common SIM information, if applicable) may be installed in the eSIM. The first personalized SIM information may be removed from the eSIM (e.g., if the user is no longer a subscriber with a carrier which provided the first personalized SIM information) or may remain in the eSIM along with the second personalized SIM information (e.g., if the user is a subscriber with both the carrier which provided the first personalized SIM information and the carrier which provided the second personalized SIM information).

Thus the disclosure herein is also directed to a method for provisioning eSIMs, a computer system configured to implement such a method, and/or to a computer accessible memory medium storing program instructions executable by a processor to implement such a method. The method may, as one example, be implemented by an eSIM server. The method may be performed as follows.

A request to provision an eSIM may be received. The request may be received from a UE device. The request may be received via one or more networks, such as one or more wired or wireless networks.

Common SIM information may be transmitted to the UE device. The UE device may install the common SIM information and transmit an indication that the common SIM information has been installed, which may be received.

A request for personalized SIM information may be transmitted to a personalization server. In some embodiments, the request may be transmitted based at least in part on receiving the indication from the UE device that the common SIM information has been installed.

The personalized SIM information may be received from the personalization server. If desired, the personalized SIM information may be received in encrypted form. The personalized SIM information may then be transmitted to the UE device. If the personalized SIM information was received in encrypted form, the personalized SIM information may also be transmitted in encrypted form.

An indication that the personalized SIM information has been installed may be received from the UE device. The common SIM information and the personalized SIM information may be configured to provision an eSIM in the UE device. Thus, after the common SIM information and the personalized SIM information have been installed in the UE device, the UE device's eSIM may be fully provisioned. The (e.g., fully provisioned) eSIM may enable the UE device to access a carrier network.

BRIEF DESCRIPTION OF THE DRAWINGS

A better understanding of the present subject matter can be obtained when the following detailed description of the preferred embodiment is considered in conjunction with the following drawings, in which.

Figure 1:
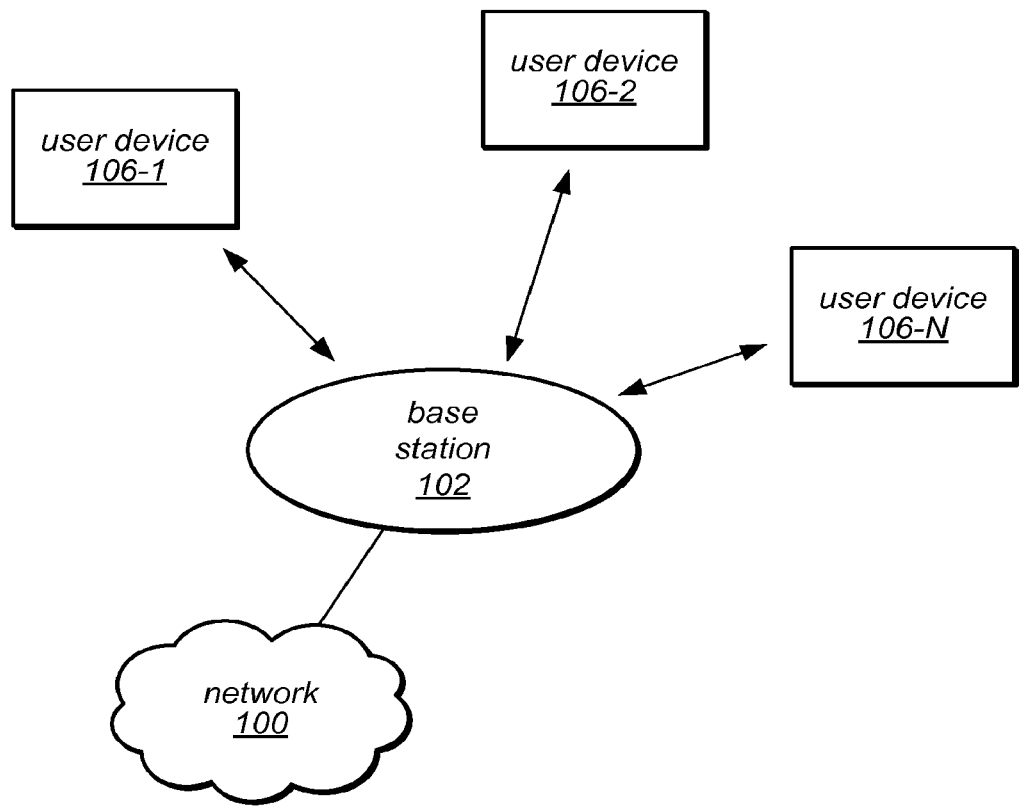
FIG. 1 illustrates an exemplary (and simplified) wireless communication system according to one embodiment.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present patent application.

3GPP: Third Generation Partnership Project
3GPP2: Third Generation Partnership Project 2
GSM: Global System for Mobile Communications
UMTS: Universal Mobile Telecommunications System
LTE: Long Term Evolution
SIM: Subscriber Identity Module
eSIM: Embedded SIM
UICC: Universal Integrated Circuit Card
eUICC: Embedded UICC
IMSI: International Mobile Subscriber Identity
MCC: Mobile Country Code
MNC: Mobile Network Code
PIN: Personal Identification Number
PUK: Personal Unblocking Code
OTA: Over-The-Air
HLR: Home Location Register

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
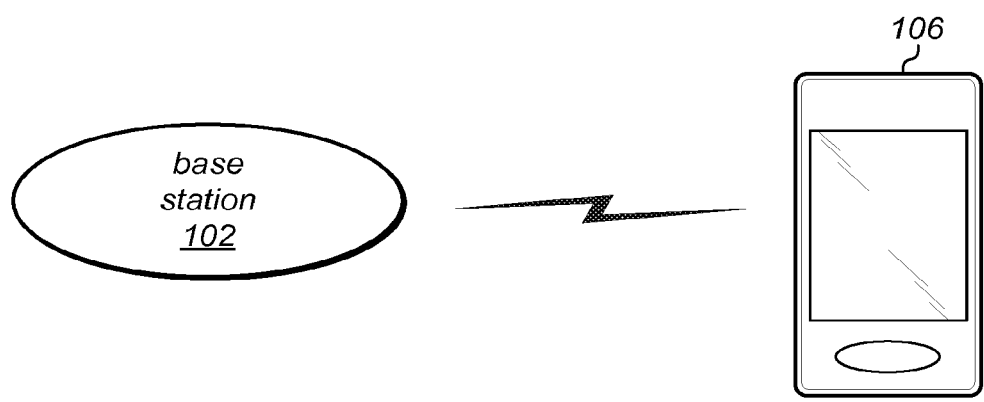
FIG. 2 illustrates a base station in communication with user equipment according to one embodiment.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are referred to as UEs or UE devices.

The base station 102 may be a base transceiver station (BTS) or cell site, and comprises hardware that enables wireless communication with the user devices 106-1 through 106-N. The base station 102 may also be equipped to communicate with a network 100. Thus, the base station 102 may facilitate communication between the user devices and/or between the user devices and the network 100.

The base station 102 and the user devices may be configured to communicate over the transmission medium using any of various wireless communication technologies or telecommunication standards such as GSM, Code Division Multiple Access (CDMA), Wireless Local Loop (WLL), Wide Area Network (WAN), WiFi, WiMAX etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

UE 106 may be capable of communicating using multiple wireless communication standards. For example, UE 106 might be configured to communicate using either of a 3GPP telecommunication standard (such as LTE) or a 3GPP2 telecommunication standard (such as CDMA2000). UE 106 might also or alternatively be configured to communicate using Wireless Local Area Network (WLAN), Bluetooth, one or more global navigational satellite systems (GNSS), (e.g., Global Positioning System (GPS) or GLONASS), one and/or more mobile television broadcasting standards (e.g., Advanced Television Systems Committee-Mobile/Handheld (ATSC-M/H) or Digital Video Broadcasting-Handhell (DVB-H), etc. Other combinations of wireless communication standards (including more than two telecommunication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication protocols. For example, the UE 106 may be configured to communicate using two or more of CDMA 2000, LTE, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or 1×RTT, and separate radios for communicating using each of Wi-Fi and Bluetooth. Other configurations are also possible.

Figure 3:
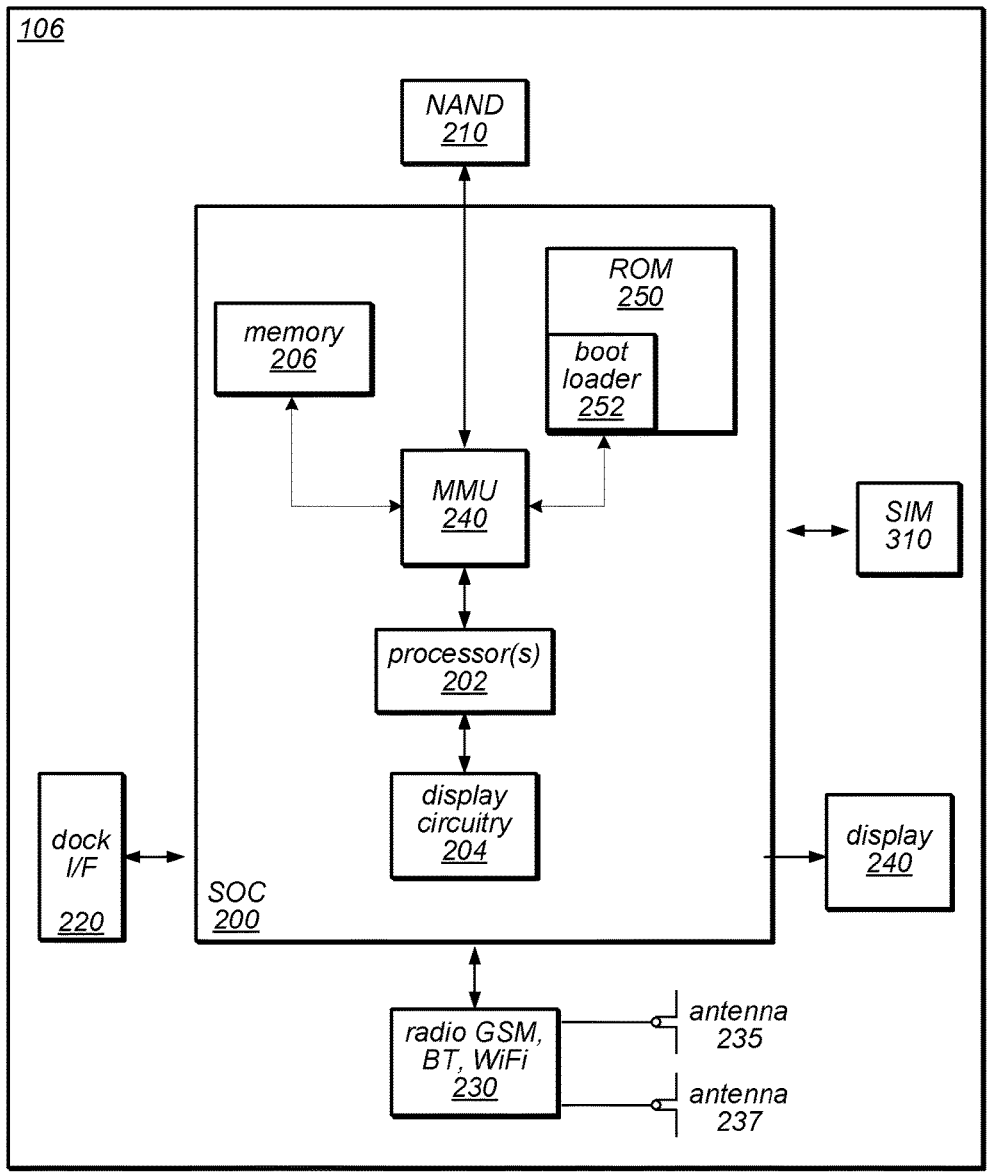
FIG. 3 illustrates an exemplary block diagram of a user equipment device, according to one embodiment.

FIG. 3—Exemplary Block Diagram of a UE

FIG. 3 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display circuitry 204. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or MMU 240. The MMU 240 may be configured to perform memory protection and page table translation or set up. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for LTE, CDMA2000, Bluetooth, WiFi, etc.).

The UE device 106 may include at least one antenna, and possibly multiple antennas, for performing wireless communication with base stations and/or other devices. For example, the UE device 106 may use antennas 235 and 237 to perform the wireless communication. The UE may be configured to communicate wirelessly using multiple wireless communication standards in some embodiments.

As described herein, the UE 106 may include hardware and software components for operating a UE device which is configured to provision a SIM or an eSIM in the UE device according to embodiments of this disclosure.

As shown, the UE 106 may include a SIM (Subscriber Identity Module) 310. The SIM may be implemented as an application on a smart card, in some embodiments. The smart card may itself be referred to as a SIM card in some cases. As one example, the SIM 310 may be an application which executes on a Universal Integrated Circuit Card (UICC). The smart card may also include (e.g., store and/or execute) one or more other applications, if desired. The smart card may be removable.

Alternatively, the SIM may be implemented as an embedded SIM (eSIM). In this case, the SIM may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 206) executing on a processor (such as processor 202) in the UE 106.

Note that a SIM may also or alternatively be installed on a removable smart card (e.g., a removable SIM card) according to embodiments of this disclosure if desired; for example, a SIM might be installed on a removable UICC and provisioned and/or re-provisioned over a network (e.g., over-the-air (OTA)). Thus, although some aspects of the disclosure are described primarily with reference to provisioning an eSIM, it should be recognized that at least some such aspects may be modified for use in provisioning a SIM on a removable smart card, e.g., in a similar manner, if desired.

The SIM 310 may include a number of types of information, including personalized information specific to a user and/or device (e.g., personalized information), and information that is not specific to a user and/or device (e.g., common information). The common portion may include files, data structures, and/or applications that may be common among some or all types of SIMs (e.g., among UICCs/eUICCs of the same profile). The personalized information may include user/unit specific data, for example information identifying the user/unit to their carrier's network, personalized authorization and/or security information, etc.

As one example, the personalized information may include an International Mobile Subscriber Identity (IMSI) number which identifies the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

Figure 4:
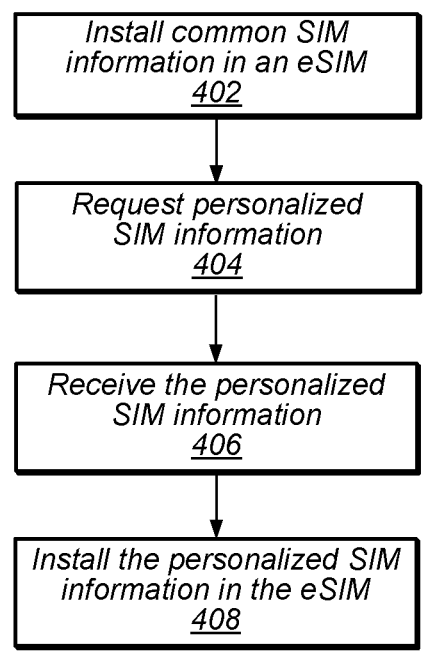
FIG. 4 is a flowchart diagram illustrating a method for personalizing an eSIM in a user equipment device according to one embodiment.

As noted above, the UE device 106 may be configured for use with an eSIM in some embodiments. The UE device 106 may initially include an eSIM which is partially provisioned (e.g., with common SIM information), or may not yet include an eSIM. In either case, a mechanism may be necessary to provision the UE device 106 with at least the personalized portion of the eSIM. FIG. 4 and the description provided with respect thereto relate to one such method for provisioning an eSIM in a UE device with personalized information.

The processor 202 of the UE device 106 may be configured to implement part or all of the methods described herein, e.g., by executing program instructions stored on a memory medium (e.g., a non-transitory computer-readable memory medium). In other embodiments, processor 202 may be configured as a programmable hardware element, such as an FPGA (Field Programmable Gate Array), or as an ASIC (Application Specific Integrated Circuit).

FIG. 4—Flowchart

FIG. 4 is a flowchart diagram illustrating a method for provisioning an eSIM in a UE device with personalized information according to one set of embodiments. The method may be implemented, at least partially, by a UE device. Some aspects of the method may be implemented by one or more server computers. For example, the UE device may be configured to request SIM provisioning information from one or more servers, which may provide the SIM provisioning information to the UE device. The UE device may then install and/or provision an eSIM on the UE device with the SIM provisioning information. The process may provide numerous benefits over a statically provisioned, physical, removable SIM card.

The method shown in FIG. 4 may be used in conjunction with any of the systems or devices shown in the above Figures, among other devices. In various embodiments, some of the method elements shown may be performed concurrently, in a different order than shown, or may be omitted. Note also that additional method elements may also be performed as desired.

The UE device may obtain common SIM information. The common SIM information may be configured for provisioning the eSIM on the UE device with non-user specific information, in some embodiments. In other words, the common SIM information might include files, data structures, and/or applications that may be common among some or all types of SIMs. For example, address book data structures and/or applications, might be included in the common SIM information. The common SIM information might also include applications or files for use in conjunction with personalized SIM information, in some embodiments, and/or firmware or software for configuring a certain type or class of smart card (e.g., to configure an eUICC on which the eSIM will be stored/executed). In one exemplary embodiment, the common SIM information may include carrier OTA keys for decrypting personalizing SIM information (and/or for other purposes).

The common SIM information may be obtained by the UE device in any of a variety of ways. According to one set of embodiments, the UE device may be pre-loaded/pre-configured with some or all of the common SIM information. For example, a UE device which includes a certain type of eUICC may be configured with information specific to executing an eSIM on that eUICC, and/or certain common SIM information may be installed on the UE device at the same time as operating system (OS) software.

Alternatively, or in addition, some or all of the common SIM information may be obtained via a network or combination of networks. The network(s) may be any type of network(s), including a cellular service provider's network, a wired or wireless local area network (LAN), a wide area network, etc.

Note that a SIM may in some cases be required to access a cellular service provider's network. In order to facilitate eSIM provisioning over a cellular network, the UE device may thus in some cases initially be provided with a "bootstrap eSIM", which may provide (e.g., limited) access to a carrier's network. For example, the bootstrap eSIM may provide access to a network only for the purpose of provisioning an eSIM. The user may then initiate embodiments of the presently disclosed method for provisioning an eSIM via the carrier's network. In some embodiments, the eSIM provisioned via embodiments of the presently disclosed method may provide access to a different carrier network (e.g., a different service provider's network) than the bootstrap eSIM. Of course it should also be noted that other means of provisioning an eSIM according to the presently described method, such as via a wired or wireless home internet connection, are also possible.

Thus, in some embodiments, once a user acquires their UE device, they may contact an eSIM provider (e.g., via the UE device), such as a service provider/carrier, and request eSIM provisioning for their UE device. Thus, the UE device may transmit a request for eSIM provisioning.

The request may be provided to a first server (an "eSIM server"). The first server may, for example, be operated by the eSIM provider (e.g., a service provider). The first server may be provide some or all of the common SIM information to the UE device (e.g., via the network/OTA).

In 402, then, the UE device may install the common SIM information in an eSIM on the UE device. Installing the common SIM information may provide basic structure for the eSIM, in some embodiments. The eSIM may be installed in/stored in/executed by a smart card (e.g., an embedded smart card, such as an eUICC) on the UE device. Alternatively, the eSIM may be installed and stored in device memory and executed by a device CPU. As another alternative, the eSIM may be installed/stored/executed by a combination of a smart card, device memory, and a device CPU. Note also that if desired, the UE device may install the common SIM information in a SIM which is not embedded on the UE device, e.g., on a removable smart card, such as a removable UICC.

The UE device may provide an indication that installation of the common SIM information was successful. This may be important, as in some cases successful installation of the common SIM information may be required before personalized SIM information may be used; for example, common SIM information might include information required to install or use the personalized SIM information. The indication may be provided to the eSIM server.

In 404, personalized SIM information may be requested. The request for personalized SIM information may be included inherently in the request for eSIM provisioning. For example, the request for eSIM provisioning may include a request for both common SIM information and personalized SIM information. Alternatively, a request may be made for just the personalized SIM information. For example, if the common SIM information is pre-loaded in an eSIM in the UE device, the UE device may only make an OTA request for the personalized UE information.

The request for personalized SIM information may be transmitted over a network or combination of networks. The request for personalized SIM information may be transmitted to the first server (e.g., as part of the request for eSIM provisioning), or alternatively, may be transmitted to a second server (a "personalization server"). In other words, in some embodiments, the eSIM provider may operate an eSIM server (e.g., responsible for providing common SIM information) and a personalization server (e.g., responsible for providing personalized SIM information). In some embodiments, the request for personalized SIM information may be transmitted to the eSIM server along with the request for common SIM information (or independently of the request for common SIM information), and the eSIM server may transmit the request for personalized SIM information to the personalization server.

The personalization server may provide the personalized SIM information. The personalized SIM information may include any of a variety of information, according to various embodiments. Generally, the personalized SIM information may be configured for provisioning the eSIM on the UE device with user (subscriber) specific information. For example, the personalized SIM information may include an International Mobile Subscriber Identity (IMSI) number, a personal identification number (PIN), a personal unblocking key (PUK), and one or more authorization keys (e.g., a K/Ki set).

The personalization server may generate the personalized SIM information in response to the request for personalization information, in some embodiments. Alternatively, personalization information may be pre-generated, e.g., to reduce network load.

The personalization server may interact with a home location register (HLR) and provisioning system of the service provider/carrier, in some embodiments. For example, prior to providing the personalized SIM information to the UE device, it may be desirable to activate service for the particular set of personalized SIM information which will be provided to the UE device, so that the UE device may be provided with service upon finishing provisioning of its eSIM. Thus, in some embodiments, the personalization server may send a request to an HLR/provisioning system to activate service for the set of personalized SIM information. The HLR/provisioning system may then activate service for the set of personalized SIM information and provide an indication that activation was successful to the personalization server.

The personalized SIM information may be provided to the UE directly (e.g., if the request was provided from the UE to the personalization server) or to the eSIM server (e.g., if the request was passed from the eSIM server to the personalization server) and thence to the UE device, in various embodiments.

In some embodiments, the personalization server may encrypt the personalized SIM information. For example, the personalized SIM information may be encrypted using carrier OTA keys. The carrier OTA keys might be included in the common SIM information, and may thus be available to the UE device to decrypt the personalized SIM information. Other ways of encrypting the personalized SIM information are also possible. Encrypting the personalized SIM information may be desirable particularly if the personalized SIM information is routed through the eSIM server, e.g., in order to prevent the eSIM server from peeking into plain-content personalized SIM information.

In 406, the personalized SIM information may be received by the UE device. The personalized SIM information may be received from the eSIM server or from the personalization server. As noted above, in some embodiments, the personalized SIM information may be encrypted, e.g., using a carrier's OTA key(s). In such embodiments, the UE device may decrypt the personalized SIM information.

In 408, the personalized SIM information may be installed in the eSIM. As noted above, the eSIM may be installed in/stored in/executed by a smart card (e.g., an embedded smart card, such as an eUICC) on the UE device, in some embodiments. In other embodiments, the eSIM may be installed and stored in device memory and executed by a device CPU. In still other embodiments, the eSIM may be installed/stored/executed by a combination of a smart card, device memory, and a device CPU. It should also again be noted that in some embodiments the UE device may alternatively install the personalized SIM information in a SIM which is not embedded on the UE device, e.g., on a removable smart card, such as a removable UICC.

Once the eSIM has been fully installed and provisioned (e.g., once the common SIM information and the personalized SIM information have been installed in the eSIM), the UE device may be configured to access a carrier network. In particular, the UE device may be configured to access the carrier network of the service provider which provided the eSIM, in some embodiments.

In some embodiments, it may be desirable to re-provision or provide additional provisioning for the eSIM in the UE device, e.g., at a later time. For example, a user may desire to switch service providers, or to receive service from multiple service providers for their UE device.

Thus, in some embodiments, the UE device may transmit a second request for provisioning information for the eSIM. The second request for provisioning information may be a request for second common SIM information and second personalized SIM information or for second personalized SIM information only, according to various embodiments.

The UE device may receive the second common SIM information and/or second personalized SIM information and install the second common SIM information and/or second personalized SIM information in the same way as with the original common SIM information and/or personalized SIM information, or in a different way, e.g., according to any of the variations described above.

The UE device may also remove the original common SIM information and/or personalized SIM information from the eSIM in some embodiments, e.g., if the user is no longer a subscriber with the carrier which provided the first eSIM.

Figure 5:
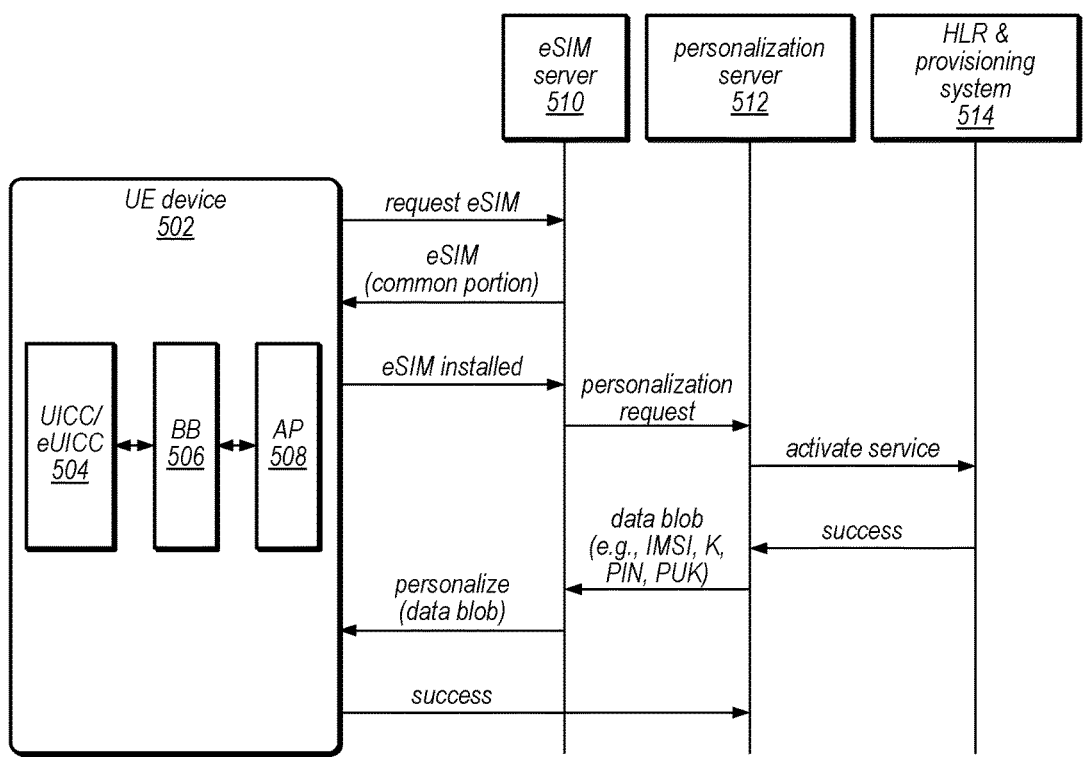
FIG. 5 illustrates an exemplary flow representing a process for personalizing an eSIM according to one embodiment.

FIG. 5—Flow Diagram

FIG. 5 illustrates an exemplary flow representing a process for personalizing an eSIM according to one embodiment. The embodiment illustrated in FIG. 5 is provided as an example of one possible implementation flow, however, it will be recognized that any number of variations or alternatives may be used as desired, and that the exemplary embodiment shown in FIG. 5 and described with respect thereto should not be considered limiting to the disclosure as a whole.

As shown, the process may involve a UE device 502, an eSIM server 510, a personalization server 512, and a home location register (HLR) and provisioning system 514. The UE device may include a UICC or eUICC 504, which may interact with a baseband (BB) layer 506, which may in turn interact with an application processor (AP) 508.

The UE device 502 may send a request for an eSIM to the eSIM server 510. The eSIM server 510 may provide the UE device 502 with common SIM information for the eSIM. The UE device 502 may install the common SIM information portion of the eSIM and provide an indication that the common SIM information portion of the eSIM has been installed to the eSIM server 510.

Once the eSIM server 510 has received this indication, the eSIM server may send a personalization request to the personalization server 512. The personalization server may be in contact with the HLR/provisioning system 514 and may send an indication thereto that service for a particular set of personalized SIM information should be activated. The HLR/provisioning system 514 may accordingly activate service for that set of personalized SIM information and, once successful, may send an indication of that success to the personalization server 512.

The personalization server 512 may then provide a data blob including the personalized SIM information (e.g., an IMSI, a key, a PIN, and a PUK, according to one embodiment) to the eSIM server 510. The eSIM server 510 may then provide the data blob to the UE device 502, which may provision its eSIM with the personalized SIM information.

The UE device 502 may then provide an indication of its success to the eSIM server 510 and/or the personalization server 512. Once the UE device 502 has been provisioned according to this process, the UE device may be able to access the carrier's network and perform wireless communications using the fully configured eSIM.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a processor;
   a memory coupled to the processor; and
   an embedded universal integrated circuit card (eUICC) coupled to the processor, wherein: i) an electronic subscriber identity module (eSIM) is present on the eUICC, ii) common subscriber identity module (SIM) information is present in the eSIM, iii) the common SIM information comprises non-subscriber-specific information that is common to a plurality of eSIMs, and iv) the memory comprises instructions that when executed by the processor cause the apparatus to:

transmit, to a server, a request for personalized SIM information, wherein the personalized SIM information comprises subscriber-specific information, receive, from the server, the personalized SIM information, and install the personalized SIM information in the eSIM present on the eUICC, wherein: i) the common SIM information and the personalized SIM information are configured to provision the eSIM on the apparatus, and ii) the common SIM information is associated with:
1) execution of the eSIM on a first type of eUICC and the eUICC is of the first type,
2) an address book application, or
3) a carrier key.

2. The apparatus of claim 1, wherein the common SIM information is pre-loaded on the eSIM at approximately the same time that operating system (OS) software is installed on the apparatus.

3. The apparatus of claim 1, wherein the personalized SIM information comprises one or more of:
an International Mobile Subscriber Identity (IMSI) number;
a personal identification number (PIN);
a personal unblocking key (PUK); or
an authorization key (K).

4. The apparatus of claim 1, wherein the common SIM information comprises an address book data structure.

5. The apparatus of claim 1, wherein the eUICC further comprises a bootstrap eSIM.

6. The apparatus of claim 5, wherein: i) the bootstrap eSIM provides access to a first carrier network, and ii) the eSIM provides access to a second carrier network different than the first carrier network.

7. A method, by an apparatus comprising an embedded universal integrated circuit card (eUICC), wherein: i) common subscriber identity module (SIM) information is present in the eSIM, and ii) the common SIM information comprises non-subscriber-specific information that is common to a plurality of eSIMs, the method comprising:
by the apparatus:
transmitting, to a server, a request for personalized SIM information, wherein the personalized SIM information comprises subscriber-specific information;
receiving, from the server, the personalized SIM information; and
installing, on the eSIM, the personalized SIM information, wherein: i) the common SIM information and the personalized SIM information are configured to provision the eSIM on the apparatus, and ii) the common SIM information is associated with:
1) execution of the eSIM on a first type of eUICC and the eUICC is of the first type,
2) an address book application, or
3) a carrier key.

8. The method of claim 7, wherein the common SIM information is pre-loaded on the eSIM at approximately the same time that operating system (OS) software is installed on the apparatus.

9. The method of claim 8, wherein the transmitting the request is comprised in a just-in-time provisioning process.

10. The method of claim 7, wherein the personalized SIM information comprises one or more of:
an International Mobile Subscriber Identity (IMSI) number;
a personal identification number (PIN);
a personal unblocking key (PUK); or
an authorization key (K).

11. The method of claim 7, wherein the common SIM information comprises an address book data structure.

12. The method of claim 7, wherein personalized SIM information is encrypted using the carrier key.

13. The method of claim 12, the method further comprising:
by the apparatus:
decrypting the personalized SIM information using the carrier key.

14. A user equipment (UE) device, the UE device comprising:
a processor;
a memory coupled to the processor; and
an embedded universal integrated circuit card (eUICC) coupled to the processor, wherein the memory comprises instructions that when executed by the processor cause the UE device to:
determine, at a first time, whether first common SIM information has been pre-loaded in an electronic subscriber identity module (eSIM) on the eUICC,
when the first common SIM information has been pre-loaded, the instructions further cause the UE device to:
send a first request to an eSIM server, and
receive, from the eSIM server, a first data blob, wherein the first data blob comprises first personalized eSIM information only, and
when the first common SIM information has not been pre-loaded, the instructions further cause the UE device to:
send a second request to the eSIM server,
receive, from the eSIM server, the first common eSIM information,
send a third request to the eSIM server, and
receive, from the eSIM server, a second data blob, wherein the second data blob comprises second personalized eSIM information.

15. The UE device of claim 14, wherein, when the first common SIM information has been pre-loaded: i) the UE device comprises a first type of eUICC, and ii) the first common SIM information is specific to executing the eSIM on the first type of eUICC.

16. The UE device of claim 14, wherein: i) a pre-loading of the first common SIM information comprises receiving the first common SIM information at a second time, ii) the first time is subsequent to the second time, and iii) the instructions further cause the UE device to receive an installation of operating system (OS) software at approximately the second time.

17. The UE device of claim 14, wherein the first personalized SIM information comprises one or more of:
an International Mobile Subscriber Identity (IMSI) number;
a personal identification number (PIN);
a personal unblocking key (PUK); or
an authorization key (K).

18. The UE device of claim 14, wherein the first common SIM information comprises an address book data structure and/or an address book application.

19. The UE device of claim 14, wherein the first common SIM information comprises a carrier key and the first personalized SIM information is encrypted using the carrier key.

20. The UE device of claim 19, wherein the instructions further cause the UE device to: decrypt the first personalized SIM information using the carrier key.

\* \* \* \* \*